(12) United States Patent
Orupold et al.

(10) Patent No.: US 12,458,980 B2
(45) Date of Patent: Nov. 4, 2025

(54) SEPARATOR APPARATUS AND FEED ARRANGEMENT FOR INCREASED CAPACITY

(71) Applicant: FLSmidth A/S, Valby (DK)

(72) Inventors: Taavi Orupold, Woolloongabba (AU); Michael Gardiner, Capalaba (AU); Byron Sadler, Wishart (AU); Andrew Klos, Pinkenba (AU); David Starr, Forest Lake (AU)

(73) Assignee: FLSmidth A/S (DK)

( * ) Notice: Subject to any disclaimer, the term of this patent is extended or adjusted under 35 U.S.C. 154(b) by 745 days.

(21) Appl. No.: 17/623,454

(22) PCT Filed: Jun. 29, 2020

(86) PCT No.: PCT/IB2020/056139
§ 371 (c)(1),
(2) Date: Dec. 28, 2021

(87) PCT Pub. No.: WO2020/261247
PCT Pub. Date: Dec. 30, 2020

(65) Prior Publication Data
US 2022/0362785 A1    Nov. 17, 2022

Related U.S. Application Data

(60) Provisional application No. 62/868,215, filed on Jun. 28, 2019.

(51) Int. Cl.
*B03B 5/48*    (2006.01)
*B01D 21/00*   (2006.01)
(Continued)

(52) U.S. Cl.
CPC ............ *B03B 5/48* (2013.01); *B01D 21/0045* (2013.01); *B01D 21/2416* (2013.01); *B03B 5/62* (2013.01)

(58) Field of Classification Search
CPC ............ B01D 21/0045; B01D 21/0057; B01D 21/0069; B01D 21/0084; B01D 21/2416;
(Continued)

(56) References Cited

U.S. PATENT DOCUMENTS 5,049,260 A * 9/1991 Spears ...................... B03B 7/00
209/208
5,103,981 A * 4/1992 Abbott ...................... B07B 9/00
209/139.1
(Continued)

FOREIGN PATENT DOCUMENTS

DE          10020286 A1    10/2001
WO       20180202711 A1   11/2018

OTHER PUBLICATIONS

Hopper Lids, https://web.archive.org/web/20170810012356/https://www.hippohopper.com/self-dumping-hoppers/parts-and-accessories/hopper-lids/#/, Aug. 10, 2017, Accessed Nov. 30, 2024. (Year: 2017).*
(Continued)

*Primary Examiner* — Magali P Slawski
*Assistant Examiner* — Marriah CG Ellington
(74) *Attorney, Agent, or Firm* — Jeffrey A. Sharp

(57) ABSTRACT

A fluidized bed separator (1) includes a feed section (4) between an upper separation chamber (19) and a main separation chamber (6). The feed section (4) has one or more feed pipes (11) extending horizontally and transversely with respect to a body wall (10) of the fluidized bed separator (1). The one or more feed pipes (11) are positioned completely and entirely underneath the inclined plates (17). An external oversize protection apparatus (3) which is separate from and external to the body wall (10) may be operatively coupled to the one or more feed pipes (11). One or more lamella cartridges (49) may be provided within channels (18) of the upper separation chamber (19), and one or more breakaway plates (54, 55) may be inserted within channels (18) to prevent sanding and facilitate insertion and extraction of the lamella cartridges (49).

13 Claims, 15 Drawing Sheets

(51) Int. Cl.
*B01D 21/24* (2006.01)
*B03B 5/62* (2006.01)
*B03D 1/08* (2006.01)
*B03D 1/14* (2006.01)

(58) Field of Classification Search
CPC .. B01D 21/2427; B03B 5/623; B03D 1/1456; B03D 1/1462; B03D 1/1481; B03D 1/1487; B03D 1/245
USPC ......................................................... 210/800
See application file for complete search history.

(56) References Cited

U.S. PATENT DOCUMENTS

| | | | | |
|---|---|---|---|---|
| 8,448,778 | B2 * | 5/2013 | Grydgaard | B65G 47/72 198/364 |
| 2014/0216986 | A1 * | 8/2014 | Orupold | B03B 1/00 209/3.1 |
| 2016/0074874 | A1 * | 3/2016 | Gardiner | B01J 8/20 209/155 |
| 2016/0144376 | A1 * | 5/2016 | Gardiner | B01J 8/20 209/157 |
| 2016/0158802 | A1 * | 6/2016 | Ong | B07B 1/46 209/420 |
| 2016/0214116 | A1 * | 7/2016 | Christodoulou | B03B 5/66 |
| 2016/0296942 | A1 * | 10/2016 | Starr | B03B 5/623 |
| 2017/0232448 | A1 * | 8/2017 | Starr | B03B 5/623 134/22.18 |
| 2018/0028941 | A1 * | 2/2018 | Lewis | B01D 21/0087 |

OTHER PUBLICATIONS

International Search Report and Written Opinion dated Dec. 21, 2020, 15 pages. Positive International Preliminary Report on Patentability dated Nov. 4, 2021, 23 pages.

* cited by examiner

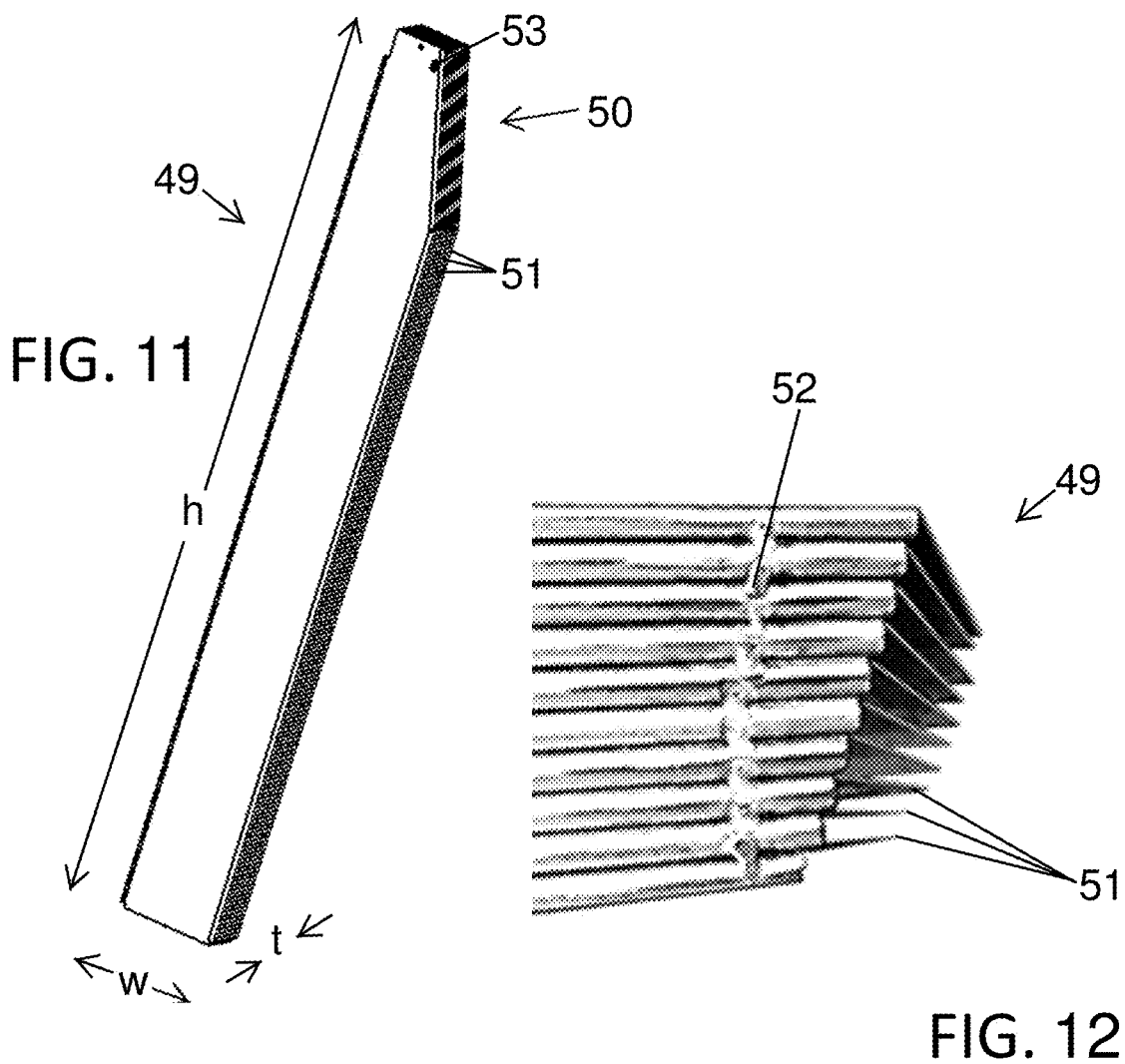
FIG. 11
FIG. 12
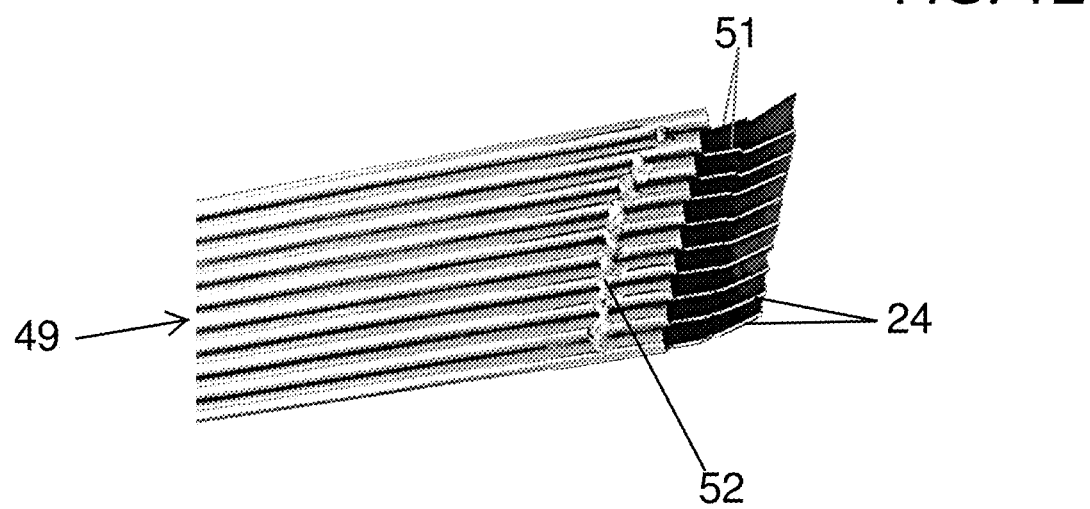
FIG. 13

SEPARATOR APPARATUS AND FEED ARRANGEMENT FOR INCREASED CAPACITY

CROSS-REFERENCE TO RELATED APPLICATIONS

None.

FIELD OF THE INVENTION

Embodiments of the invention relate to a novel fluidized bed separator (e.g., a solid-solid classifier configured to separate solids by particle size and/or density or, a coarse particle flotation unit configured to separate solids by mineralogy) and a novel feed arrangement therefor. Embodiments may be especially useful for classifying or floating particles in processes involving large throughputs (e.g., those processing 1 to 1200 cubic meters of slurry per hour or more, without limitation).

BACKGROUND OF THE INVENTION

Fluidized bed separators, such as those incorporating FLSmidth® REFLUX® Classifier technology, have proven to be largely successful at performing separations by size and/or density from slurry feed inputs. Unfortunately, a few problems are associated with the aforementioned devices.

For example, with state-of-the-art fluidized bed separators, lamella plate installation and/or removal processes can be difficult, laborious, and/or time consuming due to solids buildup. Over time, sludge builds up in the channels supporting the lamella plates which can significantly increase resistance to removal and pull out forces necessary to extract the plates from the upper separation chamber.

Conventional separator devices also need to be periodically drained to perform routine cleaning and removal of solids—including solids which accumulate from internal oversize protection apparatus located within the upper separation chamber. These servicing procedures generally require taking the separator offline for an 8-hour shift once every 1-4 weeks. Accordingly, there is a long felt need for a new separator design which obviates the need for frequent downtime to accommodate cleaning schedules.

Moreover, conventional fluidized bed separators typically have in-situ oversize protection apparatus located within an upper separation chamber that also comprises launders and inclined lamella plates. This oversize protection apparatus (as well as traditional downwardly-facing slurry feed channels which are also located in the upper separation chamber) restricts upward flow of smaller/less dense particles through lamella channels within the upper separation chamber.

Feeding slurry downward in the heart of the upper separation chamber between and amongst lamella plates also hinders upward flow of material thereby reducing separation efficiency and impacting the amount of material that can easily pass upwards into launders. The total cross-sectional flow area through the upper separation chamber is reduced because the downwardly-facing slurry feed channels and oversize protection apparatus take up volumetric space therein.

Accordingly, current fluidized bed separators are somewhat limited in the amount of material they are able to process in a given amount of time, and are unable to handle very large throughputs (e.g., slurry feeds of up to 1200 cubic meters per hour or more) since flows through lamella plates located in the upper separation chamber are hindered by the slurry feed channels and oversize protection apparatus.

Lastly, upward flow through lamellae in conventional separators may be "less than laminar" or may comprise eddy currents at lower portions of the upper separation chamber. Particularly, at lower portions of inclined plates within the upper separation chamber, turbulent flow may exist. This turbulent flow can negatively affect flow, reduce efficiency, and/or may increase wear near bottom portions of inclined plates and lamellae.

Embodiments of the present invention aim to overcome at least one, some, or all of the aforementioned problems associated with conventional separators.

OBJECTS OF THE INVENTION

According to some embodiments, it is desired to provide a particle separator device capable of processing large throughputs, without limitation.

According to some embodiments, it desired to provide a particle separator capable of online continuous flushing of oversize particles, while the apparatus is still operating, in order to reduce machine downtime, without limitation.

According to some embodiments, it is desired to provide a particle separator with increased flow area within the upper separation chamber, without limitation.

According to some embodiments, it is desired to provide a particle separator which separates and removes feed apparatus and oversize protection apparatus from the upper separation chamber to free up space therein for improved upward flow.

According to some embodiments, it is desired to provide a particle separator having reduced turbulence and smoother, more laminar flow between and around lamellae within the upper separation chamber, without limitation.

According to some embodiments, it is desired to provide a particle separator which includes means for easily removing and replacing worn or broken lamella plates, without limitation.

These and other objects of the present invention will be apparent from the drawings and description herein. Although every object of the invention is believed to be attained by at least one embodiment of the invention, there is not necessarily any one single embodiment of the invention that achieves all of the objects of the invention.

BRIEF SUMMARY OF THE INVENTION

A fluidized bed separator (1) may comprise a body wall (10) and a fluidizing section (7) having at least one fluidization fluid inlet (9) for introducing fluidization fluid into a fluidization fluid distribution chamber (25). In some embodiments, the fluidization fluid may comprise a liquid for classifying particles by size and/or density. In some embodiments, the fluidization fluid may comprise a liquid (including a flotation reagent) and/or a gas, such as air, for coarse particle flotation and separating particles by mineralogy.

The fluidizing section (7) may comprise an upper panel equipped with a plurality of fluidization outlets (26). The fluidized bed separator (1) may additionally comprise a main separation chamber (6) above the fluidizing section (7) for establishing a fluidized bed within the main separation chamber (6) by virtue of fluidization fluid exiting the fluidization fluid distribution chamber (25) through the fluidization outlets (26) and entering into the main separation chamber (6). The fluidized bed separator (1) may further comprise an upper separation chamber (19) having a plurality of inclined plates (17), cross plates (39), and channels (18) defined between the inclined plates (17) and the cross plates (39). One or more launders (15) may be provided within the upper separation chamber (19) and these launders (15) may feed a collection basin (21).

The fluidized bed separator (1) may be characterized in that it further comprises a feed section (4) located between the upper separation chamber (19) and main separation chamber (6). The feed section (4) may comprise one or more feed pipes (11). The one or more feed pipes (11) may extend horizontally and transversely with respect to the body wall (10). For example, the one or more feed pipes (11) may be positioned completely and entirely underneath the inclined plates (17) (i.e., such that the one or more feed pipes (11) are not located within the upper separation chamber (19).

In some embodiments, the one or more feed pipes (11) may comprise at least one step-down (22). For example, the one or more feed pipes (11) may reduce in diameter at a single location or at a plurality of locations within the feed section (4).

In some embodiments, the one or more feed pipes (11) may comprise a plurality of outlets (23) for introducing feed slurry into the feed section (4). As shown, in some embodiments, the outlets (23) may be arranged so as to introduce feed slurry into the feed section (4) in a generally horizontal direction which is generally transverse to a vertical axis of the fluidized bed separator (1). In other words, the one or more feed pipes (11) may be configured to distribute feed slurry into and across the feed section (4) (e.g., radially outwardly) toward the body wall (10) and inner perimeter of the feed section (4), rather than vertically downwardly within the upper separation chamber (19) as conventionally practiced.

It should be understood that the outlets (23) may, in some embodiments, be arranged to extend at various angles which are between "substantially" horizontal or "slightly off" horizontal and even vertically upwards, without limitation. For example, outlets (23) of a feed pipe (11) may extend at an angle between about minus 30 degrees from horizontal (i.e., laterally outward and slightly downward) to vertically upward (i.e., plus 90 degrees from horizontal and parallel to the vertical axis of the fluidized bed separator 1), without limitation. For certain applications, it may be desirable to configure outlets (23) so that they are arranged and oriented so as to introduce feed slurry into the feed section (4) so that the feed slurry is introduced with a vertically upward velocity component. While the outlets (23) are all shown to be oriented at true horizontal, slight angular variations from true horizontal are anticipated to be within the scope of the invention.

Outlets (23) provided to a feed pipe(s) (11) may be oriented at different angles with respect to one another, or, they may all extend at the same angular orientation as shown. Moreover, while more than one outlet (23) may be shown directly opposed from each other at certain location along a feed pipe (11), it is envisaged that outlets (23) may be staggered so that not more than one outlet (23) is provided at the same location along the feed pipe (11). It is further envisaged that outlets (23) which are located at the same location along the feed pipe (11) may not necessarily be diametrically opposed as shown. Moreover, it is contemplated that more than two outlets (23) may be located at any one location along the feed pipe (11). Additionally, while outlets (23) are shown to extend orthogonally from feed pipes (11) at a right angle, in alternative arrangements, outlets (23) may extend from feed pipes (11) at angles which are not perpendicular therewith.

In some embodiments, an external oversize protection apparatus (3) which is separate from and external to the body wall (10) may be provided to the fluidized bed separator (1). In other words, unlike with conventional separators, the upper separation chamber (19) of the fluidized bed separator (1) may be devoid of oversize protection apparatus.

The external oversize protection apparatus (3) may be provided to either side of the upper separation chamber (19), but it is shown in the accompanying figures to be located adjacent to the collection basin (21). As will be described herein-after, the shown feed pipe endcaps (36) may be removed to position the external oversize protection apparatus (3) on an opposite side of the separation chamber (19) from what is shown. In such an embodiment, feed pipe endcaps (36) may be swapped to the diametrically opposing side of the fluidized bed separator (1), and breather pipes (14) may either be lengthened to traverse the width of upper separation chamber (19); or, the breather pipes (14) may be adapted to fluidly communicate with another portion of the upper separation chamber (19) such as channels (18), without limitation.

The external oversize protection apparatus (3) may comprise a screen box (12), an inlet (13) to the screen box (12), one or more screens (38) (e.g., two inclined screens within the screen box), an oversize chute (30) (e.g., defined by two chute side panels (31), a chute top plate (47), and a chute end plate (32)). An oversize removal pipe (33) may communicate with the oversize chute (30) and serve to remove oversize particles and prevent oversize particles from entering the one or more feed pipes (11).

In some embodiments, the external oversize protection apparatus (3) may include a main chamber (41) above the one or more screens (38) and above the oversize chute (30). The external oversize protection apparatus (3) may also comprise a regulated size chamber (42) below the one or more screens (38) and below the oversize chute (30). The main chamber (41) and regulated size chamber (42) may be defined by screen box (12).

In some embodiments, the external oversize protection apparatus (3) may include deflector (40) adjacent a bottom floor (43) of the screen box (12) for splitting and distributing slurry evenly to two feed pipes (11). As will be appreciated from the drawings, the bottom portion of the regulated size chamber (42) of the external oversize protection apparatus (3) may be defined by a bottom floor (43) of the screen box (12) and/or a deflector (40).

In some embodiments, the external oversize protection apparatus (3) may further include one or more removable top access panels (37) which may cover openings in the screen box (12). The one or more removable top access panels (37), if employed, may facilitate cleaning or servicing of the screen box (12), the oversize channel (30), and/or the one or more screens (38), without limitation.

In some embodiments, the external oversize protection apparatus (3) may include a purge valve (45) and a purge valve actuator (44) to remove oversize material from the oversize removal pipe (33).

In some embodiments, the external oversize protection apparatus (3) may inelude at least one purge fluid inlet (34, 46) for flushing solids from the oversize channel (30) and/or for flushing solids from the oversize removal pipe (33), without limitation. In some embodiments, the external oversize protection apparatus (3) may include at least one breather pipe (14) fluidly communicating with the collection basin (21) within the upper separation chamber (19). However, for embodiments where the external oversize protection apparatus (3) is mounted on the other side of the upper separation chamber (19) from what is shown, the at least one breather pipe (14) may fluidly communicate with one or more portions of the upper separation chamber (19), such as with the channels (18), without limitation.

In some embodiments, the fluidized bed separator (1) may comprise a tapered body section (5) below the feed section (4) and above the main separation chamber (6). The tapered body section (5) may increase the relative cross-sectional area of the feed section (4) and/or upper separation chamber (19) with respect to the cross-sectional area of the main separation chamber (6) and fluidizing section (7), without limitation. In this regard, more channels (18) can be provided within the upper separation chamber (19) to increase classifying efficiency.

In some embodiments, at least one lamella cartridge (49) may be disposed in each one of said channels (18) defined between the inclined plates (17) and the cross plates (39). The at least one lamella cartridge (49) may comprise a plurality of parallel, uniformly-spaced lamella plates (51). The at least one lamella cartridge (49) may, as shown in FIG. 11, have a height (h), a width (w), and a thickness (t). These lamella cartridge (49) dimensions are preferably complementary to the size and/or shape of the channels (18) between the inclined plates (17) and cross plates (39).

In some embodiments, the lamella plates (51) may be metallic and may be joined together via welds at a welded portion (52).

In some embodiments, the at least one lamella cartridge (49) may comprise an angled section (50), without limitation. In some embodiments, the at least one lamella cartridge (49) may comprise a removal or installation feature (53), without limitation.

In some embodiments, the fluidized bed separator (1) may comprise at least one breakaway plate (54, 55) in at least one of the channels (18). In some embodiments, each channel (18) may comprise at least one breakaway plate (54, 55). The at least one breakaway plate (54, 55) may be configured to prevent sanding in said at least one of the channels (18). The at least one breakaway plate (54, 55) may also or alternatively be configured to facilitate removal of a lamella cartridge (49) from a channel (18) by creating a void space upon its removal from the channel (18).

In some embodiments, the at least one breakaway plate (54, 55) may comprise a polymeric material (e.g., a plastic, hard rubber, or polymer such as polyurethane or polyethylene). For example, breakaway plates (54, 55) described herein may comprise a low-density or high-density polyethylene material without limitation. It is further envisaged that the at least one breakaway plate (54, 55) may comprise materials such as cermets or other metallic substrates, for example, stainless steel, without limitation.

In some embodiments, a first breakaway plate (54) and a second breakaway plate (55) may be inserted in one of said channels (18) as suggested in FIGS. 14-17. In some embodiments, the first breakaway plate (54) and the second breakaway plate (55) may contact each other via their complimentary angled abutment surfaces (59). In some embodiments, the second breakaway plate (55) may be configured in an "L"-shape. For example, the second breakaway plate (55) may comprise a saddle seat (60) on which the first breakaway plate (54) rests, without limitation. In some embodiments, a vertically-oriented flow lead-in tab (24) may be provided to the bottom of one, some, or all of the inclined plates (17). In preferred embodiments, each inclined plate (17) is provided with its own vertically-oriented flow lead-in tab (24).

The fluidized bed separator (1) may comprise a support frame (8) which may be used for transport and assembly and optionally removed after installation in a plant or commissioning. However, the support frame (8) or portions thereof may remain installed for supporting portions of the fluidized bed separator (1), without limitation.

A method of assembling a fluidized bed separator (1) is further disclosed. The method may comprise the step of inserting one or more lamella cartridges (49) into one or more of the channels (18). In this regard, lamellae may be quickly and easily installed and removed from channels (18) of the upper separation chamber (19), and the tolerances, spacing, and parallelness between lamellae can be more tightly controlled. In some embodiments, the method may comprise the step of inserting one or more breakaway plates (54, 55) into one or more of the channels (18). In some embodiments, the method may comprise the step of inserting one or more feed pipes (11) into the feed section (4) below the upper separation chamber (19) and below the inclined plates (17), but above the fluidizing section (7).

A method of operating a fluidized bed separator (1) may comprise the step of removing oversize material from the screen box (12), oversize channel (30), and/or oversize removal pipe (33) via the purge valve (45). This may be done by periodically activating the purge valve actuator (44). The method may further comprise the step of introducing purge fluid through a first (34) and/or second (46) purge fluid inlet to assist with removing oversize material from the screen box (12), oversize channel (30), and/or oversize removal pipe (33), without limitation.

DESCRIPTION OF THE DRAWINGS

To complement the description which is being made, and for the purpose of aiding to better understand the features of the invention, a set of drawings illustrating a preferred, non-limiting embodiment of a separator 1 and components thereof is attached to the present specification as an integral part thereof, in which the following has been depicted with an illustrative and non-limiting character. It should be understood that like reference numbers used in the drawings may identify like components.

FIGS. 11-13 show various embodiments of a lamella cartridge 49 according to exemplary non-limiting embodiments.

In the following, the invention will be described in more detail with reference to drawings in conjunction with exemplary embodiments.

DETAILED DESCRIPTION

Figure 1:
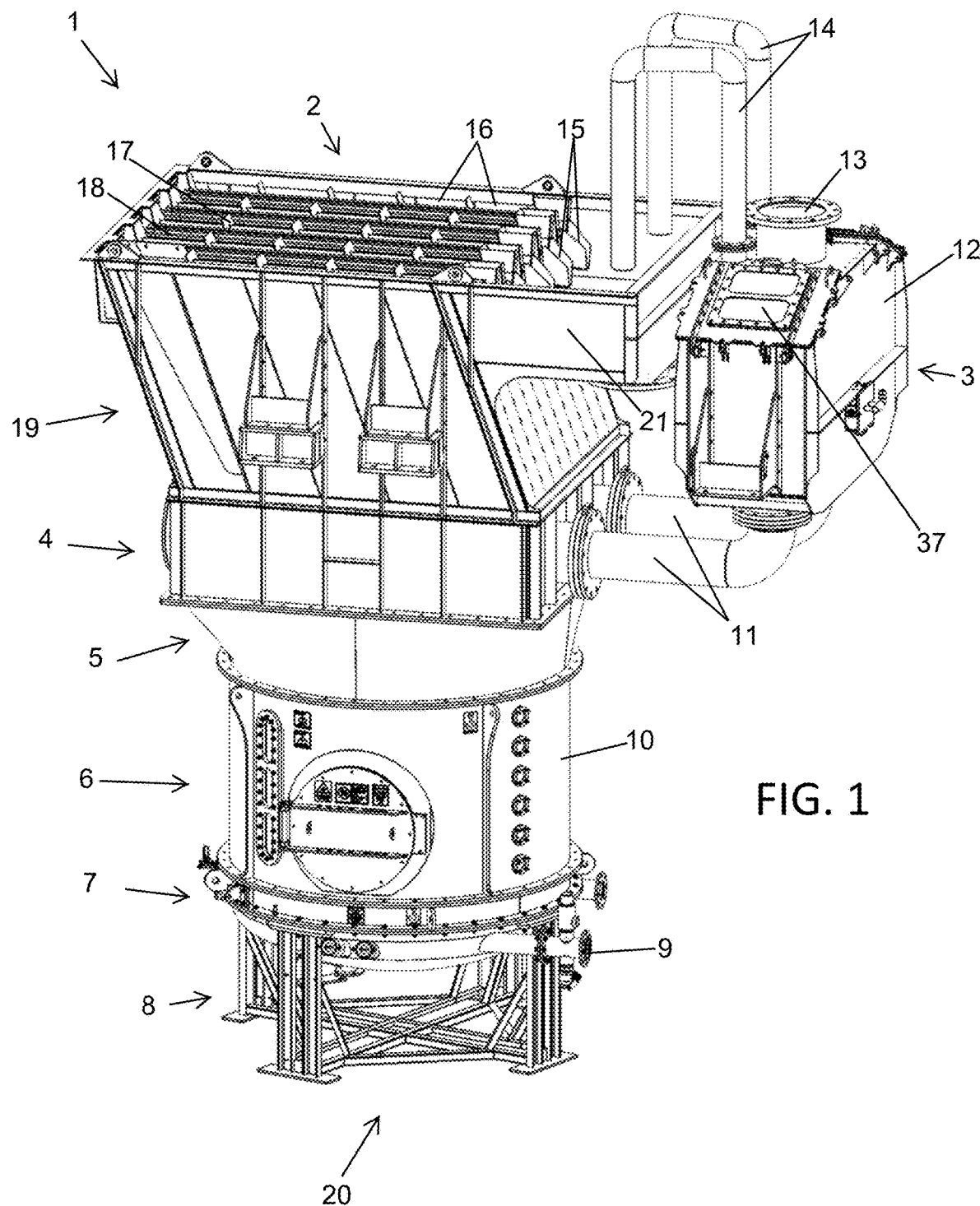
FIG. 1 shows one exemplary non-limiting embodiment of a fluidized bed separator 1 according to the invention. For clarity, the top cover of the fluidized bed separator 1 is not shown in the figures.
Figure 2:
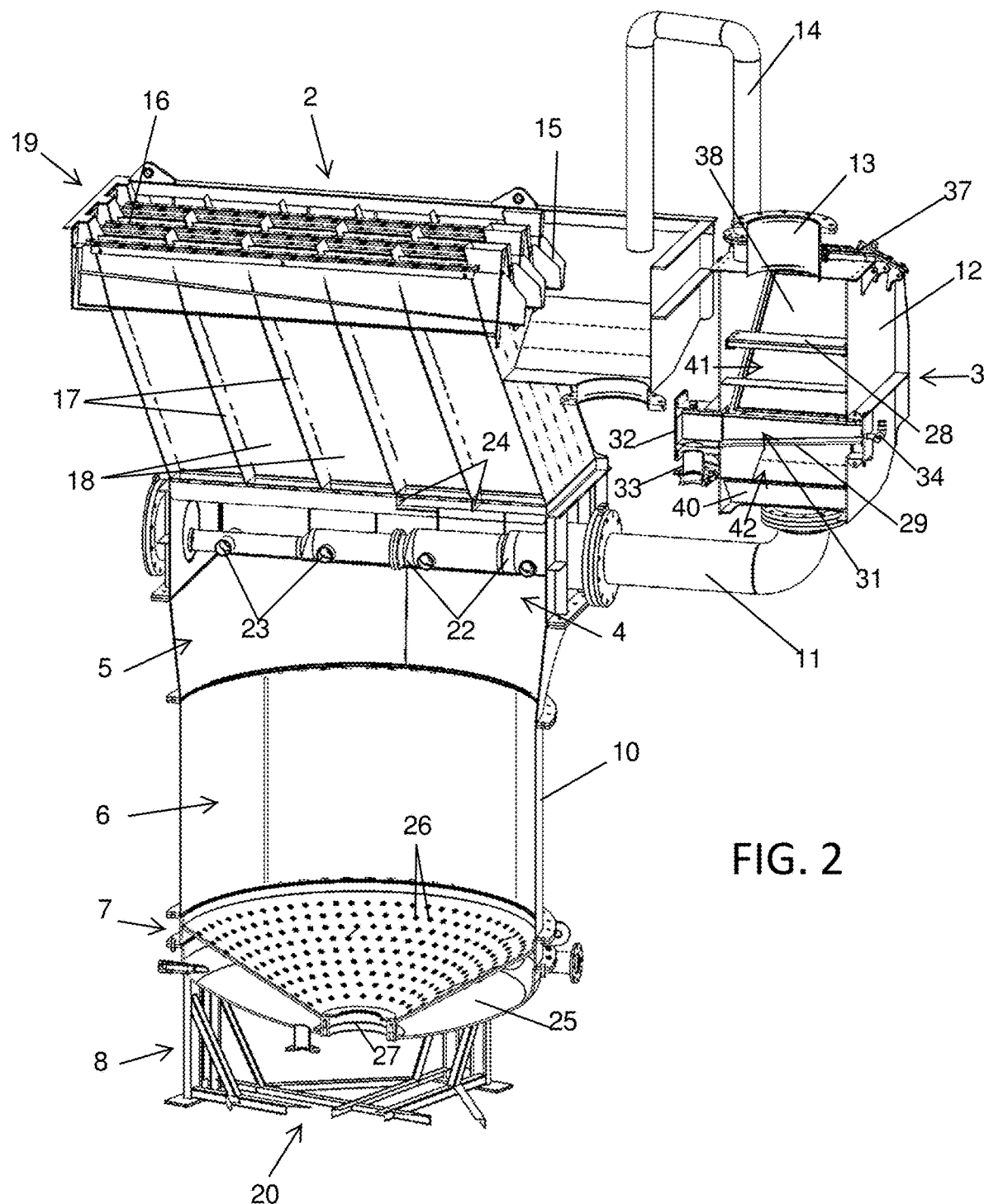
FIG. 2 is a cutaway view of the fluidized bed separator 1 shown in FIG. 1.
Figure 3:
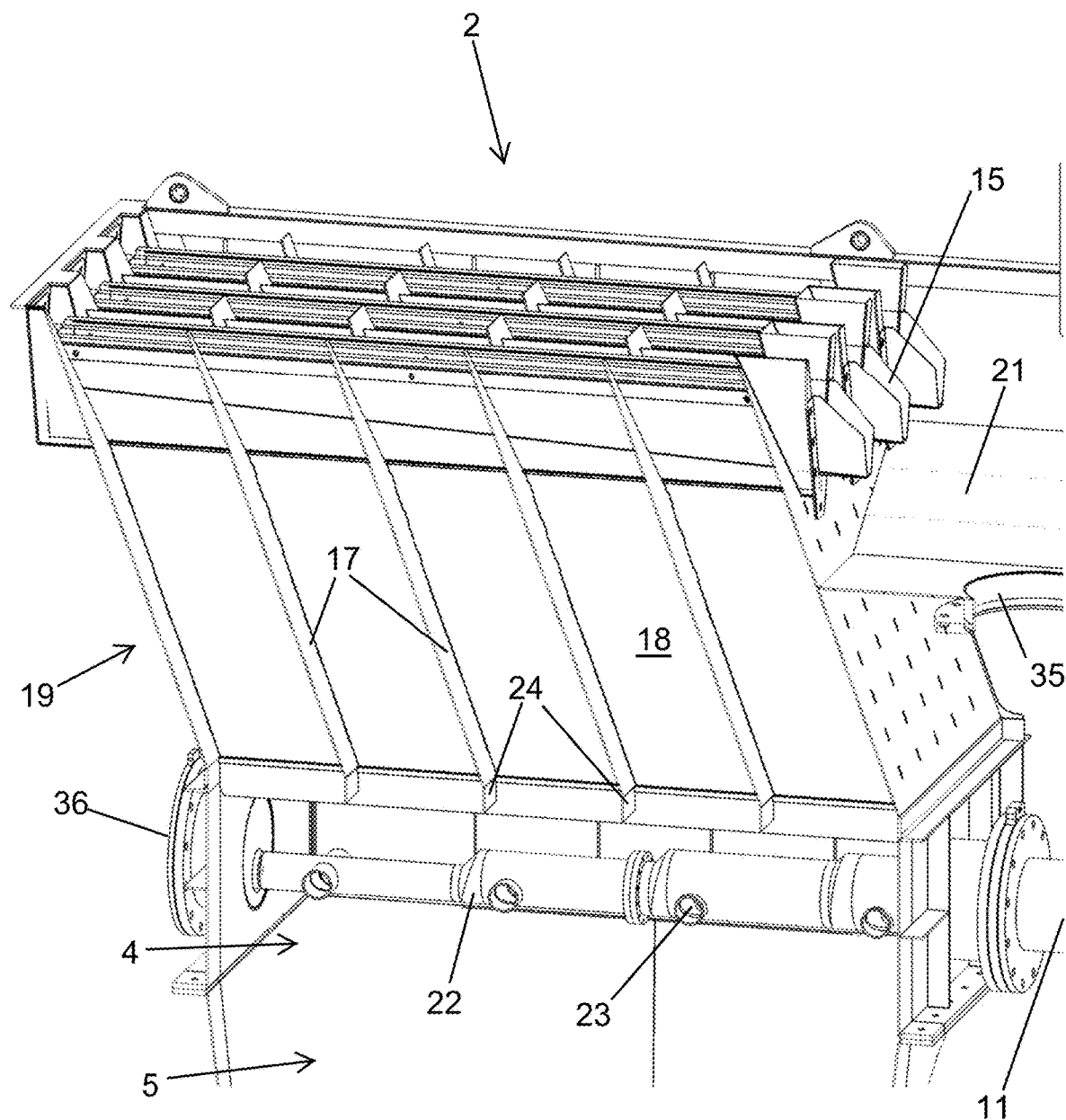
FIG. 3 shows a close-up view of FIG. 2 more clearly showing vertically-oriented flow lead-in tabs 24 and stepdowns 22 and outlets 23 of feed pipes 11.
Figure 4:
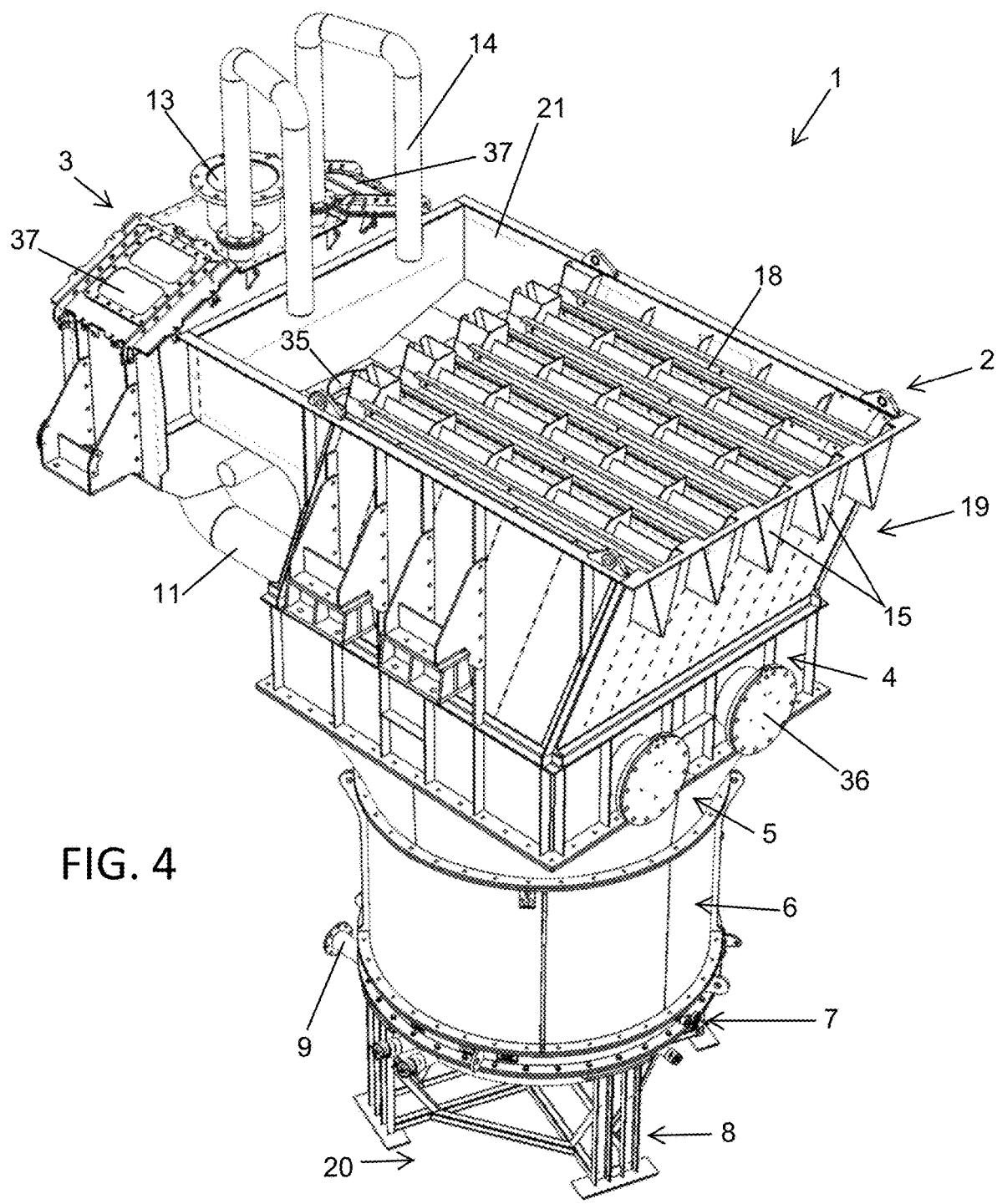
FIG. 4 shows another isometric view of a fluidized bed separator 1 of FIG. 1.
Figure 5:
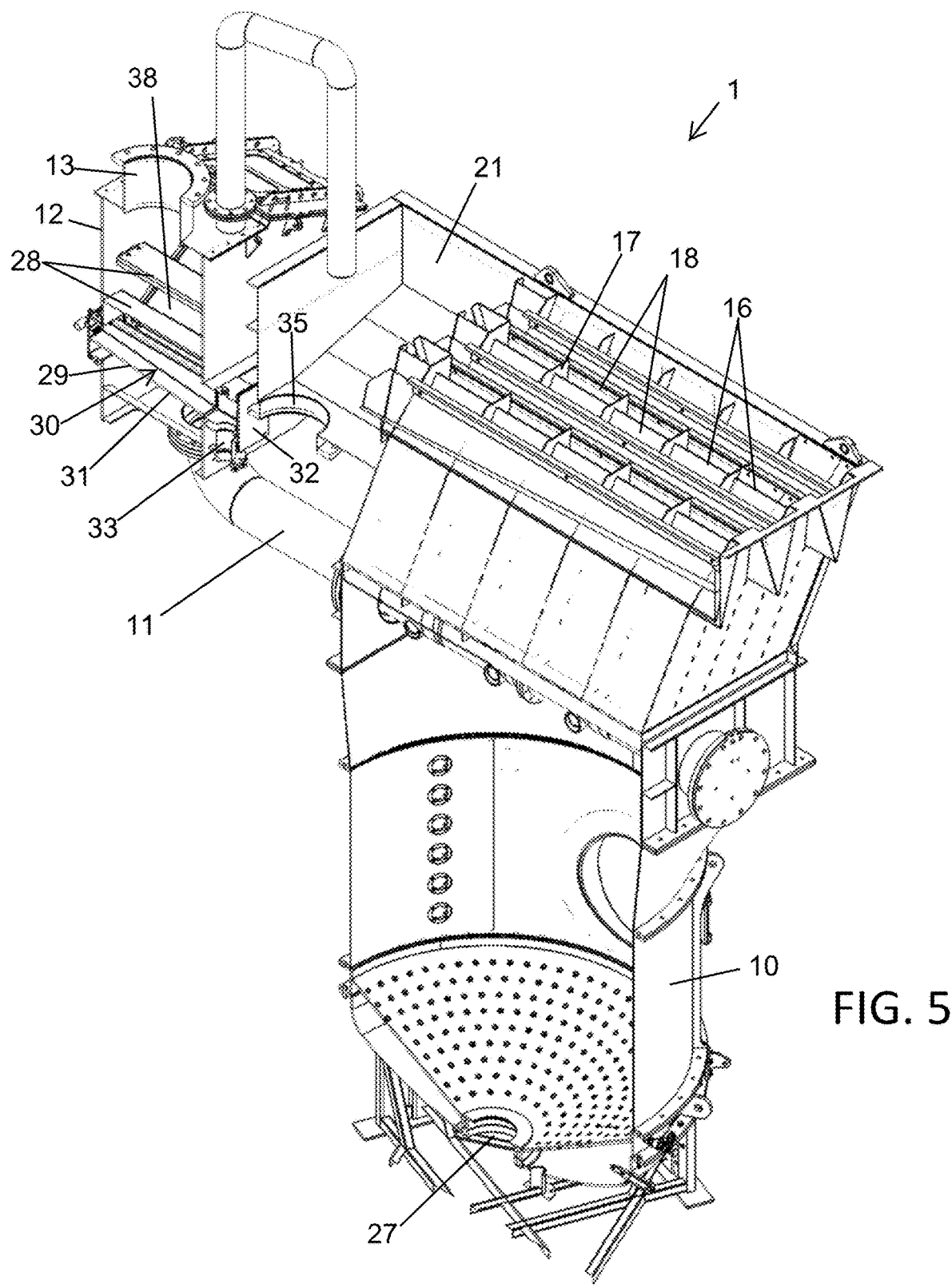
FIG. 5 is a first cutaway view of FIG. 4.
Figure 6:
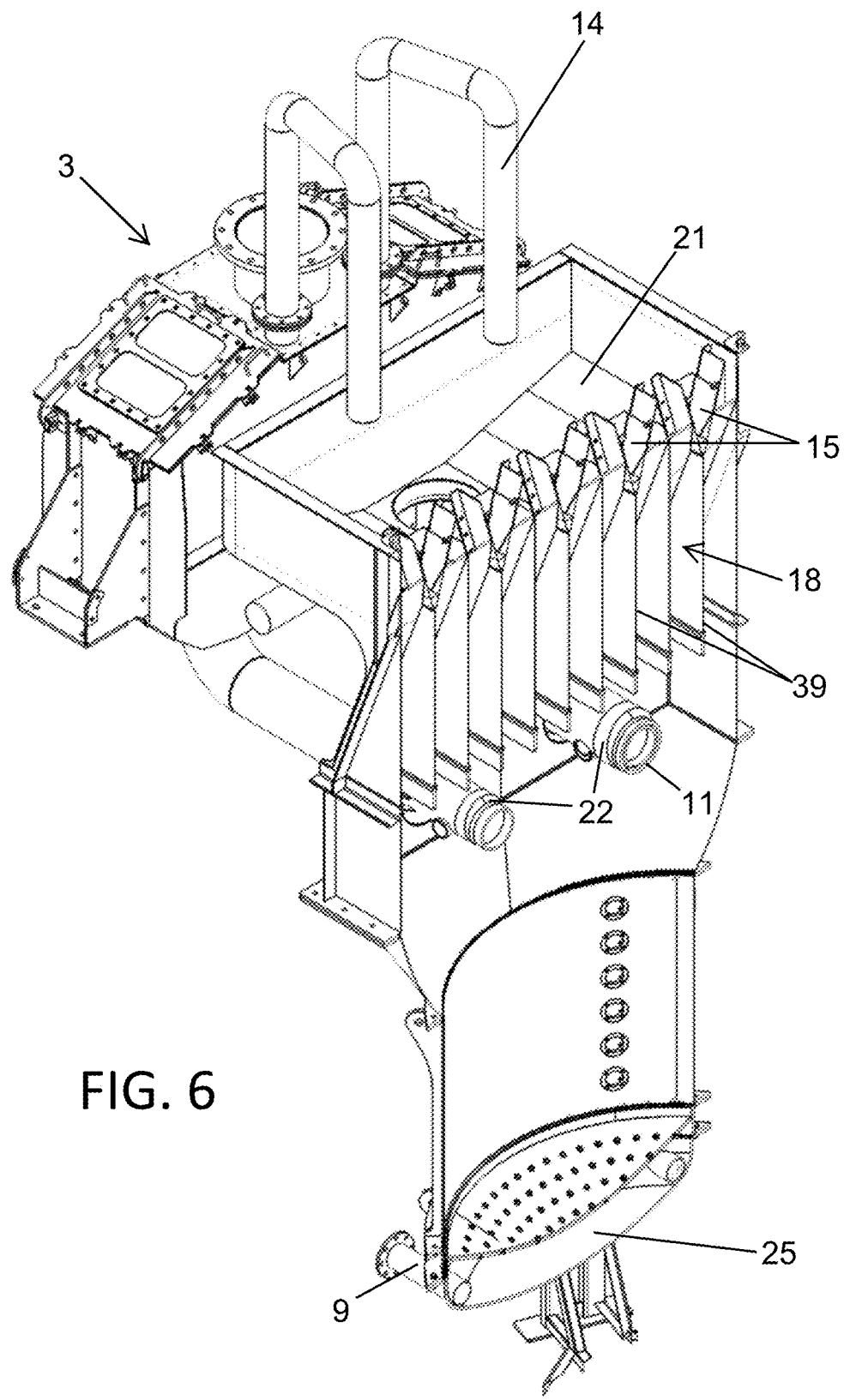
FIG. 6 is a second cutaway view of FIG. 4 which is perpendicular to the view shown in FIG. 5.
Figure 7:
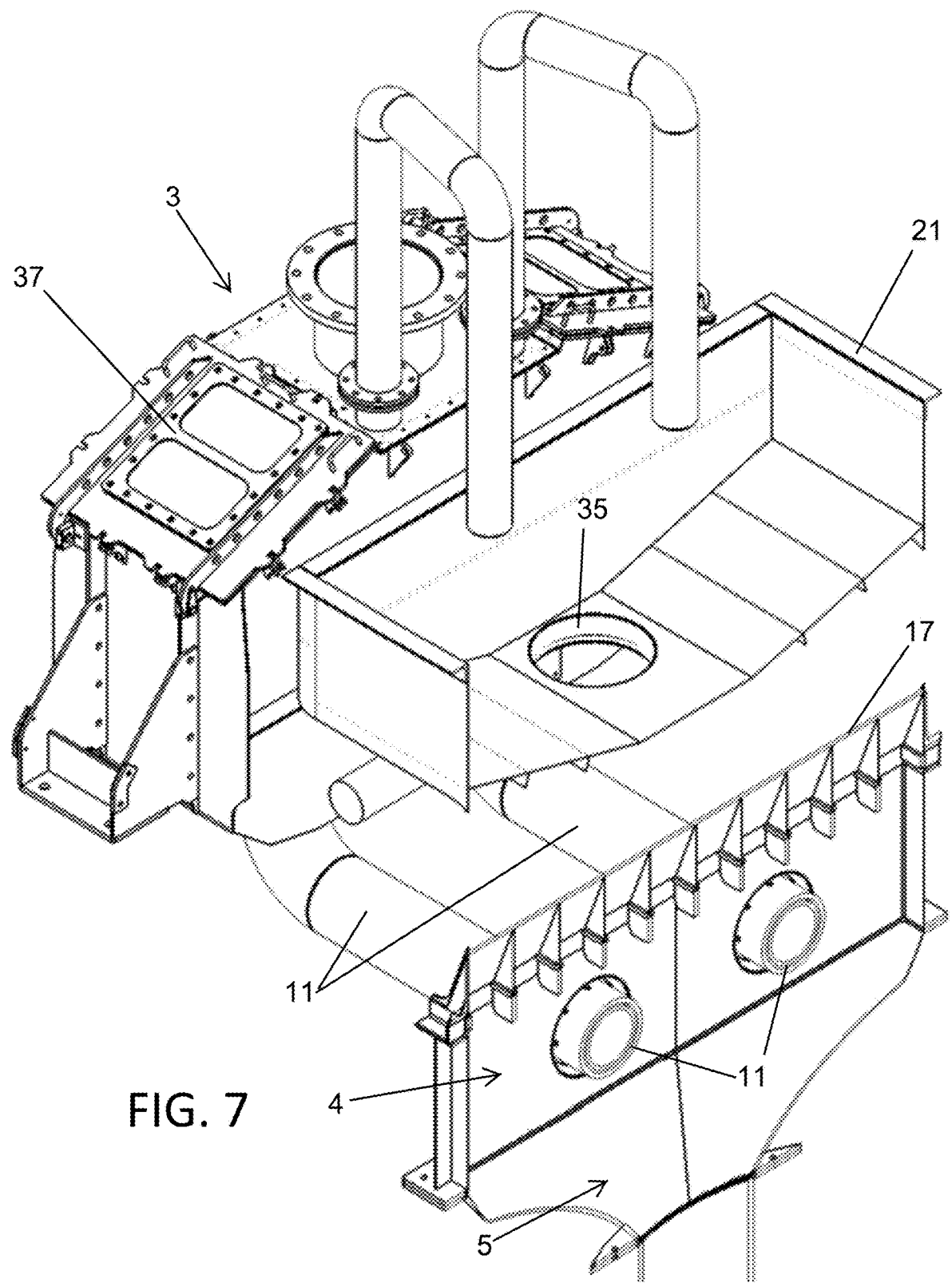
FIG. 7 is another cutaway view of the fluidized bed separator 1 shown in FIG. 1.
Figure 8:
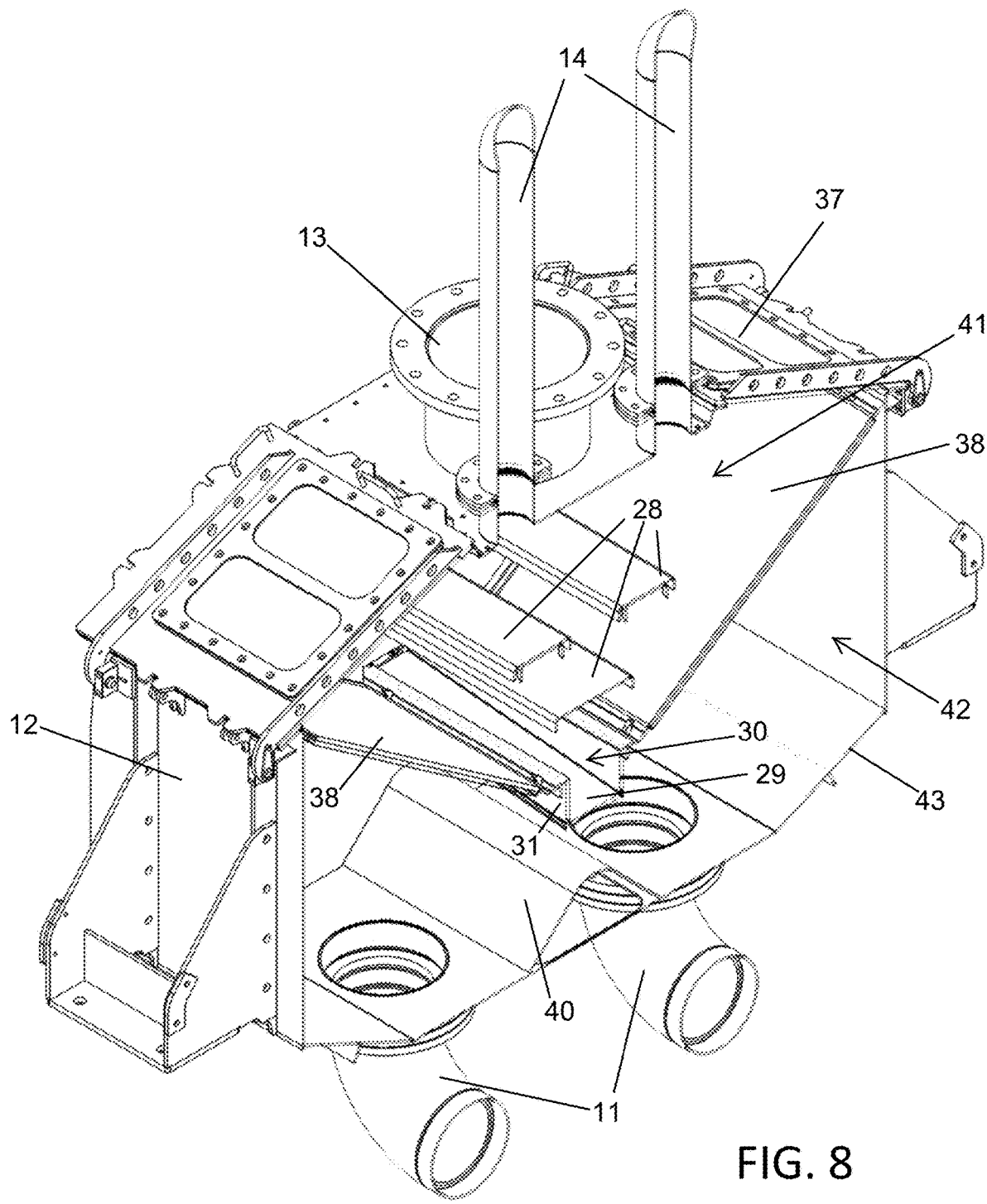
FIGS. 8-10 show various cutaway views of external oversize protection apparatus 3 of the fluidized bed separator 1 shown in FIGS. 1-7.
Figure 9:
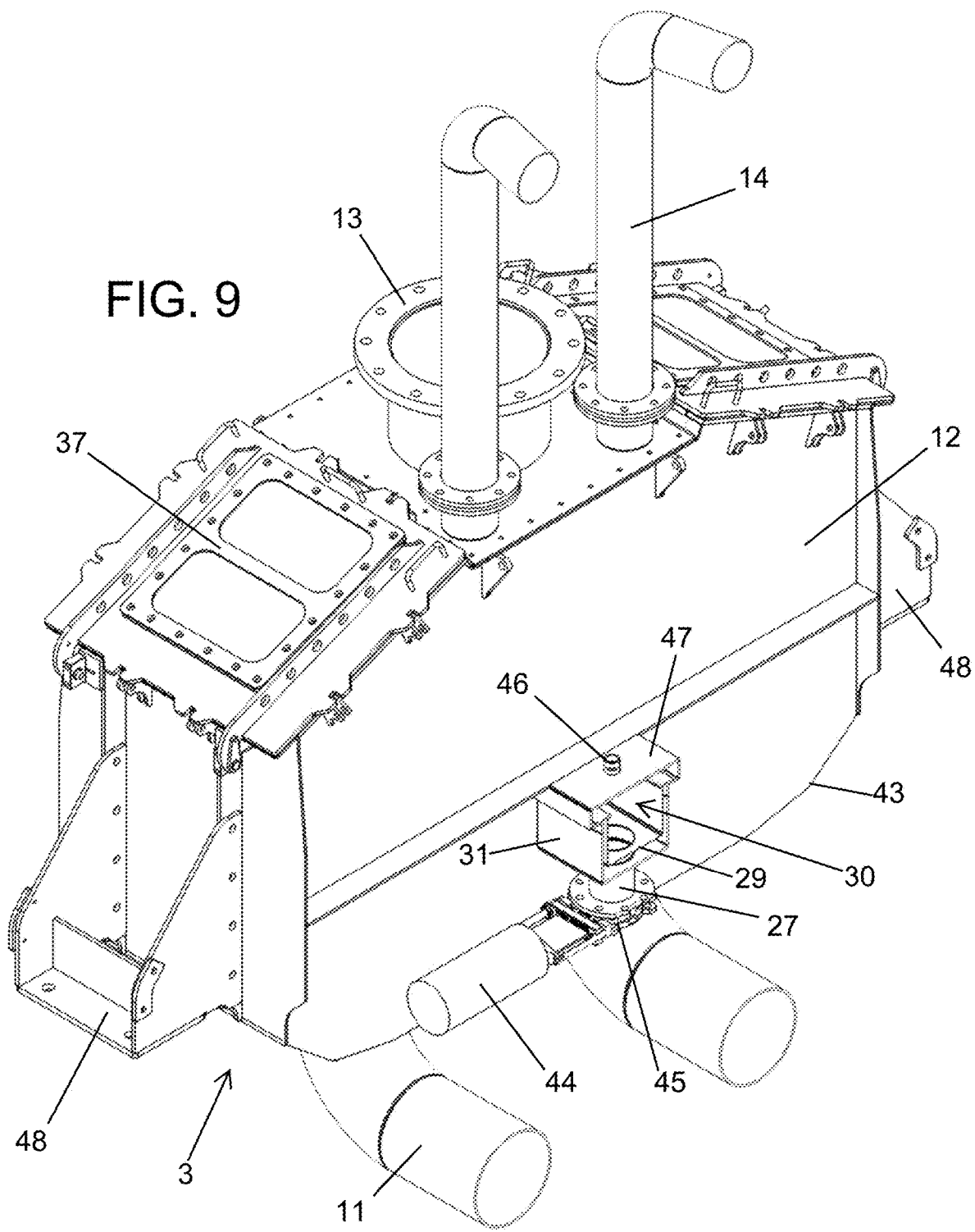
Figure 10:
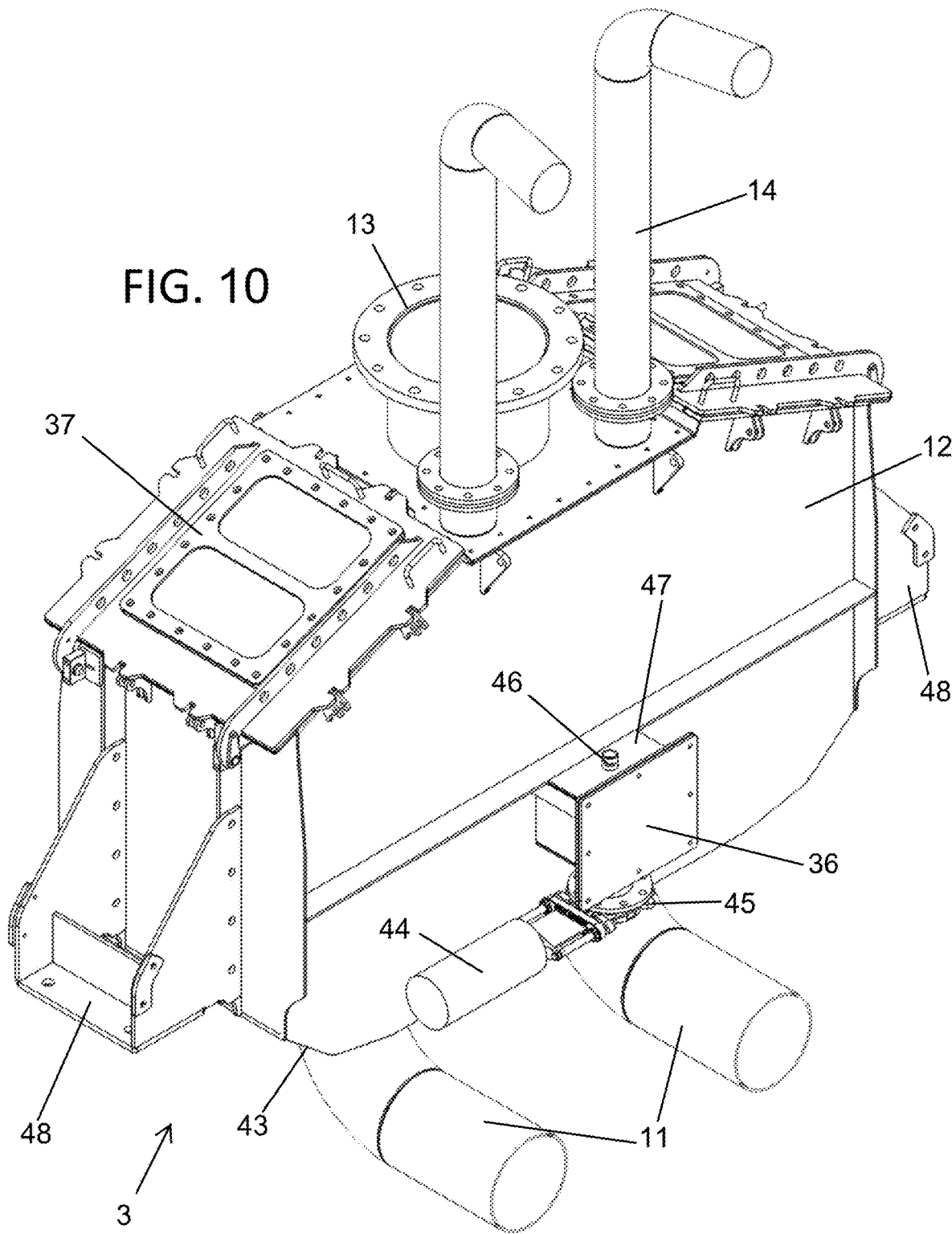
Figure 14:
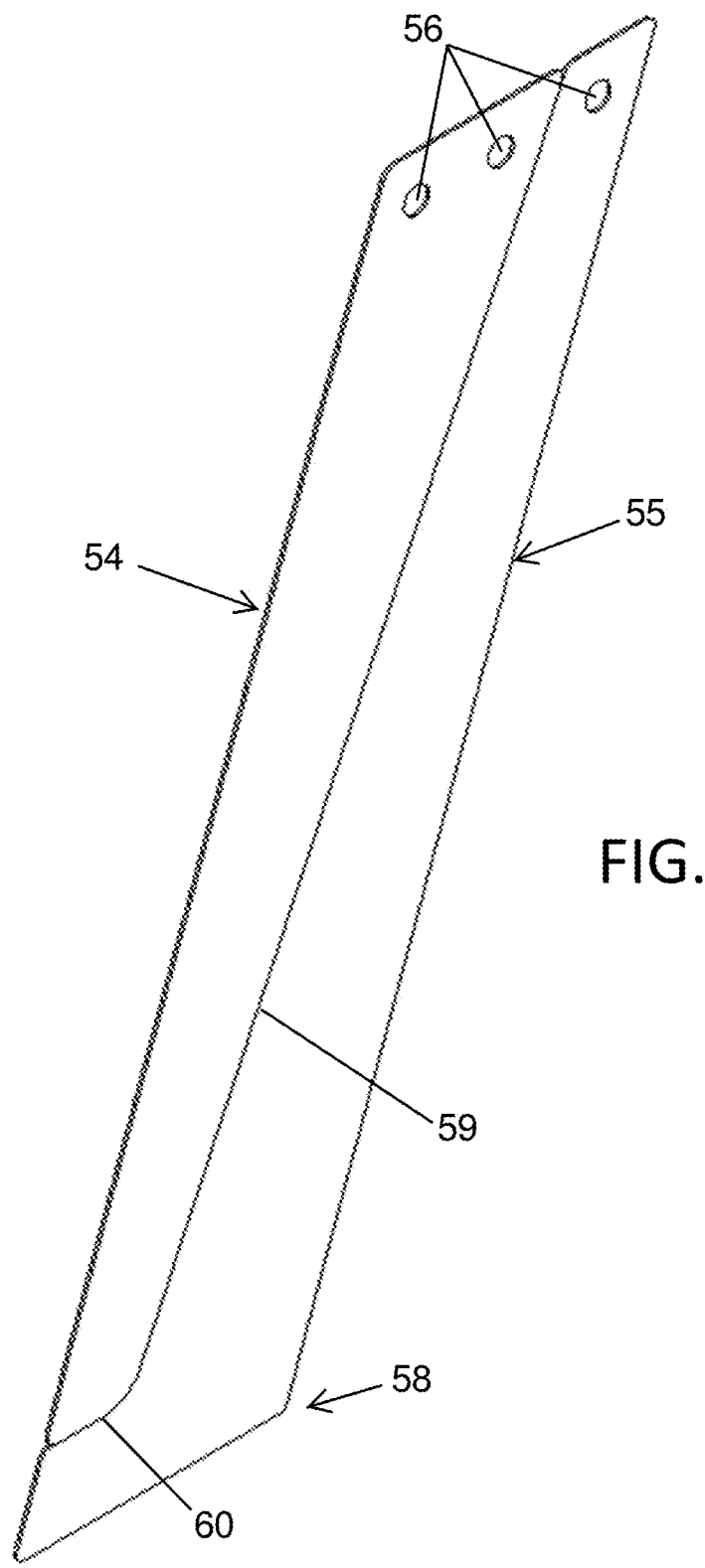
FIG. 14 shows one exemplary embodiment of breakaway plates 54, 55 which may be installed in channels 18 to avoid sanding and facilitate removal of lamella cartridges 49 from channels 18 in the upper separation chamber 19.
Figure 15:
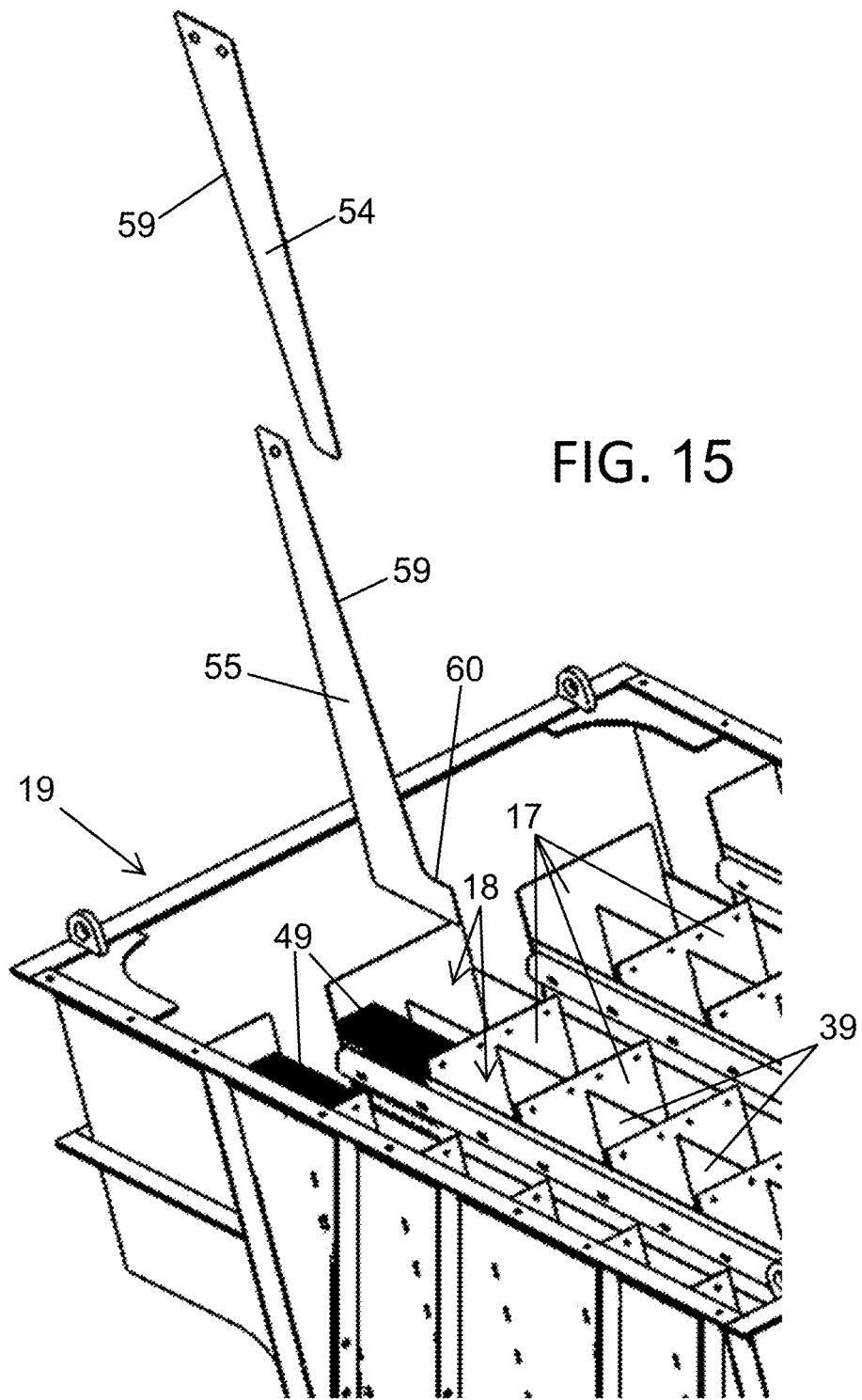
FIGS. 15-17 illustrate various views of breakaway plates 54, 55 being installed within channels 18 of an upper separation chamber 19, according to a non-limiting embodiment.
Figure 16:
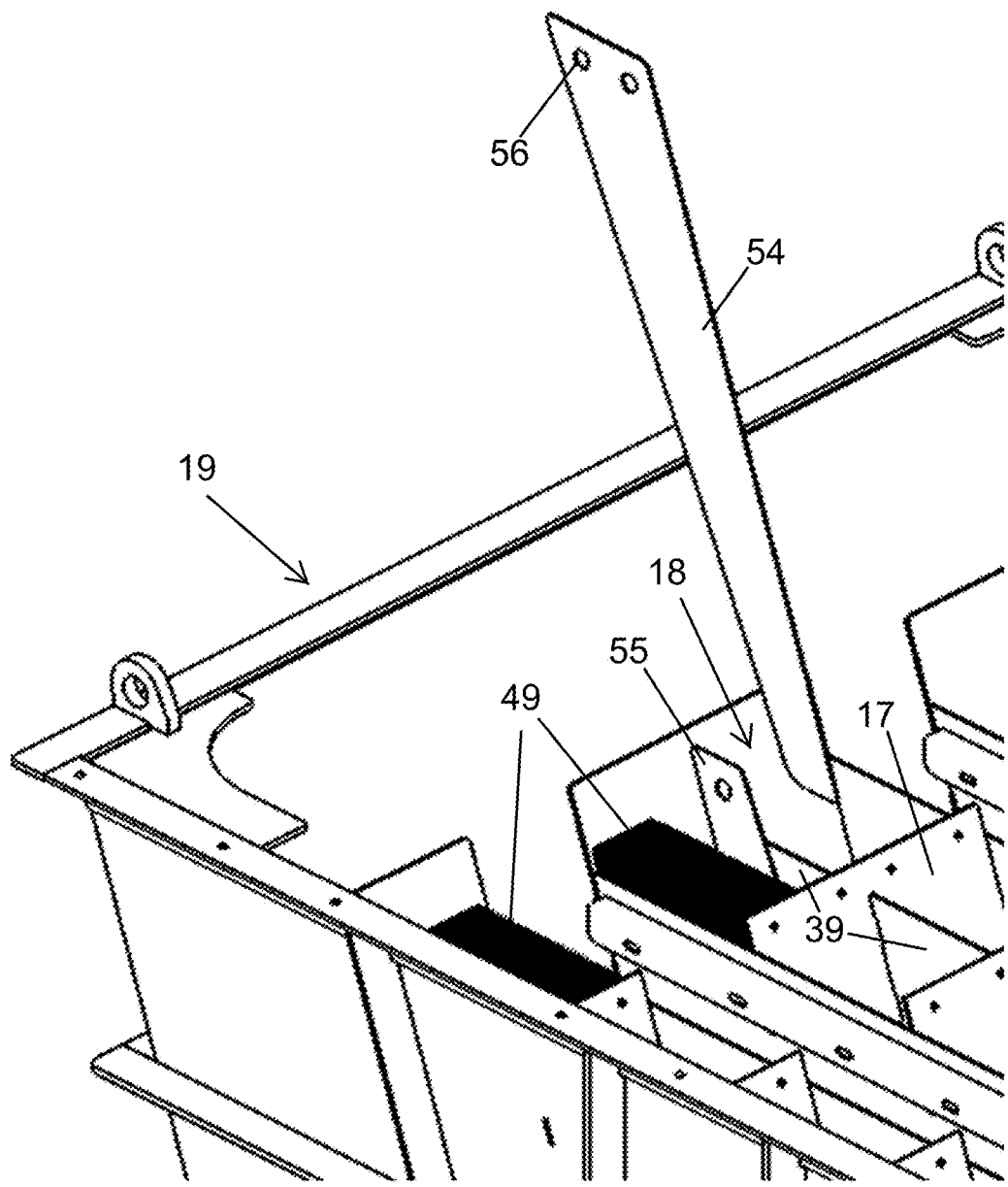
Figure 17:
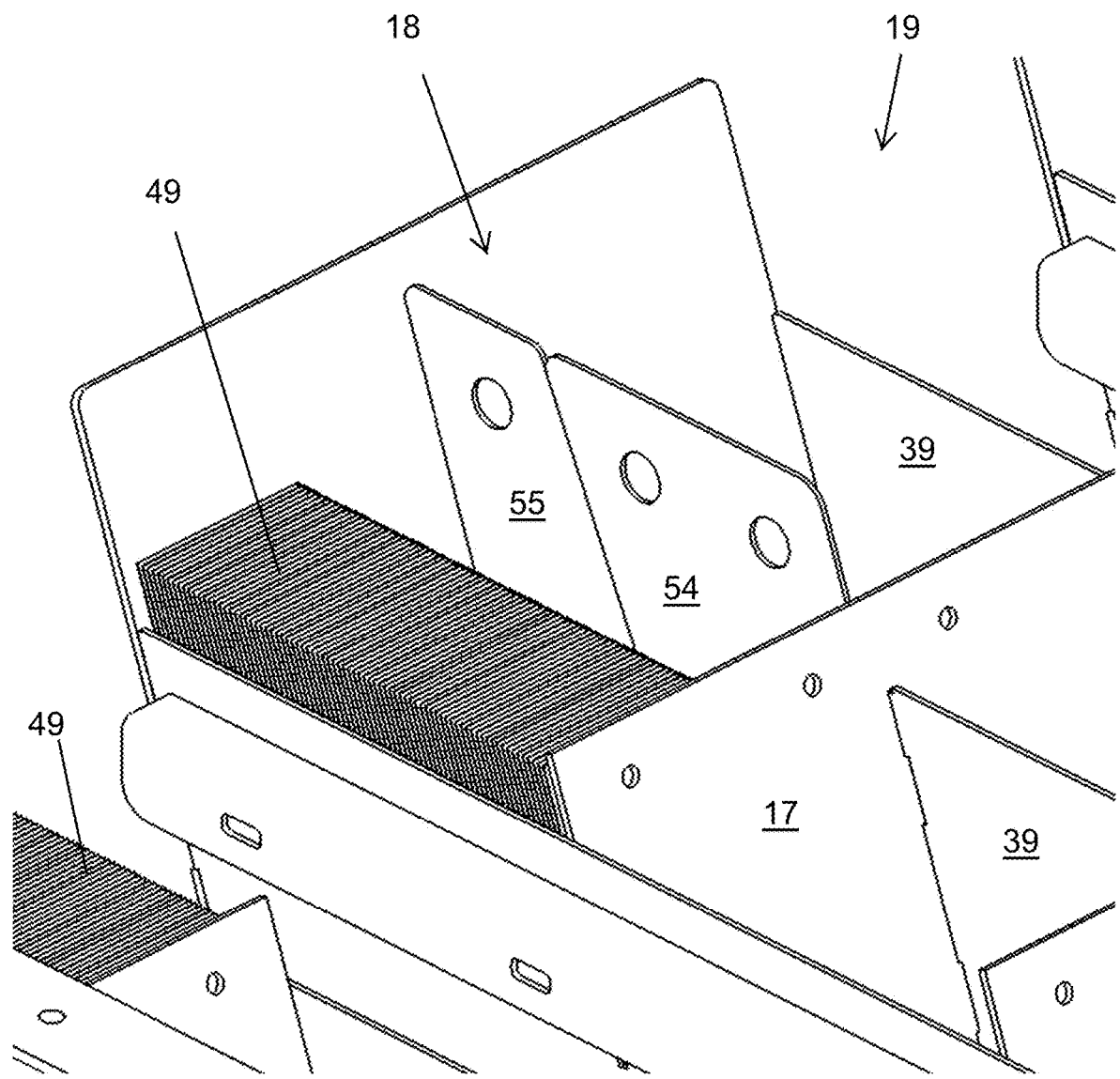

A fluidized bed separator 1 configured to classify or separate solids by particle size and/or density is disclosed and shown in FIGS. 1-17.

It should be understood that the fluidized bed separator 1 described herein may also be advantageously configured to separate solids by mineralogy and therefore used in coarse flotation processes. This may be done by introducing a mineral-dependent selectively binding reagent to make certain solids within the feed slurry hydrophobic or hydrophilic, and introducing a gas, such as air, into one or more fluidization fluid inlets 9, fluidization fluid distribution chamber 25, fluidization outlet(s) 26, main separation chamber 6, feed pipe(s) 11, inlet 13, external oversize protection apparatus 3, a combination thereof, without limitation. It should further be understood that other equivalent forms of pre-contacting gas, such as air, with feed slurry being introduced to the fluidized bed separator 1 are envisaged. In this regard, target minerals within feed slurry to the fluidized bed separator 1 can be separated from gangue and removed via collection basin 21 (e.g., during normal coarse flotation) or removed from lower outflow pipe 27 (e.g., during a reverse coarse flotation process).

The fluidized bed separator 1 may comprise an upper end 2 and a bottom end 20 and an imaginary vertical axis extending from the upper end 2 to the bottom end 20. The fluidized bed separator 1 may have a support frame 8 underneath a fluidizing section 7. The support frame 8 may be used for transport and assembly and optionally removed after installation in a plant or commissioning. However, it (or portions thereof) may be left in place for supporting the fluidized bed separator 1, without limitation.

The fluidizing section 7 may comprise at least one fluidization fluid inlet 9 communicating with a fluidization fluid distribution chamber 25. Preferably, two (or more) fluidization fluid inlets 9 may be used, without limitation.

Fluidization fluid inlets 9 may be configured to receive a liquid and/or a gas, such as process water and/or compressed air.

For classification purposes, fluidization fluid inlets 9 of the fluidized bed separator 1 may be configured to receive liquids.

For usage of a fluidized bed separator 1 as a coarse particle flotation unit, purpose-dedicated fluidization fluid inlets 9 may be provided for separately introducing gas or liquid into fluidization fluid distribution chamber 25, without limitation. In such embodiments, one or more fluidization fluid inlets 9 may be configured as an air sparger, without limitation. Alternatively, one or more fluidization fluid inlets 9 may be configured to adequately entrain a gas within a liquid. A fluidization fluid inlet 9 may be configured to deliver both a gas and a liquid to the fluidization fluid distribution chamber 25, without limitation.

Above the fluidizing section 7 is a main separation chamber 6. The fluidization fluid distribution chamber 25 may be separated from the main separation chamber 6 by a panel comprising a plurality of fluidization outlets 26. The fluidization outlets 26 may comprise openings, nozzles, spargers, a combination thereof, or other similar fluid transfer devices for transferring fluidization fluid from the fluidization fluid distribution chamber 25 to the main separation chamber 6.

Above the main separation chamber 6 is a tapered body section 5 wherein a body wall 10 of the fluidized bed separator 1 flares radially outwardly towards its upper end. While not expressly shown, for some applications, this tapered body section 5 may alternatively flare radially inwardly, such that its upper end is narrower than its lower end, without limitation.

Above the tapered body section 5 is a feed section 4 which comprises one or more horizontally-arranged feed pipes 11. Feed pipes 11 receive slurry from an external oversize protection apparatus 3, and deliver it to the feed section 4 of the fluidized bed separation 1. Feed pipes 11 may be closed off at their ends by the body wall 10 or by feed pipe endcaps 36 as shown, without limitation. The endcaps 36 may be removable for access and cleaning of the insides of feed pipes 11.

As shown, each feed pipe 11 may comprise one or more step-downs 22 which reduce the total cross section thereof. The step-downs 22 help ensure even distribution of flow through outlets 23 provided to the feed pipes 11. The outlets 23 differ from traditional feed channels because they direct incoming slurry horizontally across (and/or upwardly within) the fluidized bed separator 1 underneath the inclined plates 17, rather than downwardly between the inclined plates 17. The outlets 23 may be arranged at angles other than true horizontal and therefore may be configured to introduce slurry into the feed section 4 with some downward and/or upward velocity component. As described above, outlets 23 may be oriented vertically upwardly to direct the flow of slurry towards the upper separation chamber 19 above the feed section 4, without limitation. There may be one or a plurality of feed pipes 11 in feed section 4. For example, two are shown in the depicted embodiment, without limitation.

Above the feed section 4 is an upper separation chamber 19 comprising one or more launders 15 which feed a collection basin 21. The collection basin 21 is provided with a collection basin outlet 35. The launder(s) 15 are configured with weirs which capture overflow containing particles of smaller size and/or density and convey them to the collection basin 21. Conversely, a lower outflow pipe 27 located at the bottom of the fluidized bed separator 1 conveys particles of larger size and/or density from the main separation chamber 6.

The lower outflow pipe 27 may be used to remove oversize particles when the fluidized bed separator 1 is used as a classifier device. If the fluidized bed separator 1 is used as a coarse particle flotation unit, the lower outflow pipe 27 may be used to remove a target mineral or gangue (depending on whether normal or reverse flotation processes are used). The lower outflow pipe 27 may be fitted with a pinch valve or plug valve having a complementary seat to limit underflow rate of material leaving the fluidized bed separator 1 via the lower outflow pipe 27.

The upper separation chamber 19 may further comprise a number of inclined plates 17 and cross plates 39 which run generally orthogonal to the inclined plates 17, as shown, thereby forming inclined channels 18 therebetween. The channels 18 are each configured to allow upward passage of fluid and solids. The channels 18 are each configured to receive one or more lamella cartridges 49 therein. To reduce turbulence, eddy formation, and wear at the bottom of inclined plates 17, one or more vertically-oriented flow lead-in tabs 24 may extend vertically downwardly from inclined plates 17 as shown, so as to form an obtuse angle with respective inclined plates. Each tabs 24 may help direct flow of fluid in the feed section 4 upwardly into a nearby channel 18 before the flow direction changes and the fluid enters between lamella plates 51 within the nearby channel 18. By providing a tab 24 to an inclined plate 17, wear to the same inclined plate 17 may be reduced, and overall efficiency of the fluidized bed separator 1 may be increased, without limitation. Moreover, tabs may help to condition the flow to the channels (18) by balancing flows across the same.

Each lamella cartridge 49 may comprise a number of lamella plates 51 which are stacked so as to be somewhat parallel and uniformly spaced from one another.

The lamella plates 51 may be joined together using any mechanical means known in the art, for example, by fasteners (e.g., bolts, nuts, and spacing washers) or by a welded portion 52 (e.g., comprising welds) as shown. Lamella plates 51 are preferably made of metallic material, but it is conceivable that the same could be made of other materials. The lamella plates 51 may optionally be coated or Gladded with another material for wear resistance and/or to change the frictional characteristics thereof. For example, the lamella plates 51 may be dipped in a urethane or rubberized coating, or, they may be coated or plated with a low friction substance such as diamond-like carbon (DLC), polytetrafluoroethylene (PTFE), or the like, without limitation.

The cartridges 49 may include one or more removal or installation features 53, such as a hole for engaging a hook or cable for lowering and raising the cartridge 49 into or from its respective channel 18 within the upper separation chamber 19. Also, because of the inclined geometry of the channels 18, the lamella cartridges 49 may comprise an angled section 50 without limitation. Each lamella cartridge 49 may comprise a height h, a width w, and a thickness t, which is preferably complementary to a size and/or geometry of channels 18 within the upper separation chamber 19.

In some embodiments, some or all channels 18 may comprise a breakaway plate mount 16 or mounting area for insertion of one or more breakaway plates 45, 55. For example, as shown in FIGS. 14-17, a first breakaway plate 54 and a second breakaway plate 55 may be received within a channel 18, without limitation. As with the lamella cartridges 49, each breakaway plate 54, 55 may also be equipped with one or more removal or installation feature(s) 56, such as a hole for engaging a hook or cable for lowering and raising a breakaway plate 54, 55 into or from its respective channel 18 within the upper separation chamber 19.

The breakaway plates 54, 55 may each have a top end 57, and a bottom end 58. As shown in the exemplary, non-limiting embodiment found in the drawings, a first 54 and second 55 breakaway plate may each have mating complimentary angled abutment surface(s) 59. One of the breakaway plates (e.g., the second breakaway plate 55) may comprise an "L" shape, and a saddle seat 60. The saddle seat 60 may be configured to support the other breakaway plate (e.g., support first breakaway plate 54).

The breakaway plates 54, 55 are preferably made of a polymeric material (e.g., polyurethane or polyethylene, such as a low-density LOPE, high-density polyethylene HOPE, or ultra-high molecular weight polyethylene UHMWPE material) and are used to fill void spaces where sanding and solids build-up normally occur. In this regard, when breakaway plates 54, 55 are removed, a void within a channel 18 is created which provides enough clearance for easy, low-friction removal (or insertion) of lamella cartridges 49 within that same channel 18.

Outside of the body wall 10, and laterally adjacent the upper separation chamber 19, may be provided an external oversize protection apparatus 3. The external oversize protection apparatus 3 may comprise a screen box 12 having an upper inlet 13 for receiving slurry feed. A number of top access panels 37, which are preferably removable, may be provided to the sides or top of the screen box 12 as shown. The panels 37 may be removed to perform routine maintenance, servicing, and/or cleaning functions, without limitation.

Slurry enters the inlet 13 and enters a main chamber 41 of the screen box 12 where it settles. One or more horizontally-arranged plates or baffles 28 may be provided within the main chamber 41 to deflect flow and/or reduce velocity of the feed to the inlet 13. Below the main chamber 41 is a regulated size chamber 42. The main chamber 41 is separated from the regulated size chamber 42 by one or more screens 38 and an oversize chute 30. As shown, the one or more screens 38 may comprise a plurality of inclined screens 38 which direct oversized material (i.e., screen overflow) to the oversize chute 30 and ultimately out an oversize removal pipe 33. Controlled removal of oversize material from the oversize chute 30 and removal pipe 33 may be achieved through the use of a purge valve 45 (e.g. knife gate or ball valve) actuated via a purge valve actuator 44 (e.g., a solenoid, a fluid cylinder, or the like).

The oversize chute 30 may extend transversely across a vertical cross-section of the screen box 12 as shown, and may protrude from the screen box 12 as shown. The oversize chute 30 may be defined by chute side panels 31, a chute end plate 32, a chute top plate 47 (e.g., if protruding from the screen box 12), and an inclined floor 29. In some embodiments, the inclined floor 29 of the oversize chute 30 may be a smooth solid surface, or it may comprise a secondary screen, without limitation. The screens 38 are designed to limit the size of material received from inlet 13 within the regulated size chamber 42. The feed pipe(s) 11 are operatively connected to and in fluid communication with the regulated size chamber 42, and so in this regard, particles exceeding a mesh size associated with screens 38 will be prevented from entering the feed section 4. A deflector 40 may be provided to a bottom floor 43 of the screen box 12, for exam-pie, between feed pipes 11 as shown, to evenly split and/or distribute slurry material within the regulated size chamber 42 to the feed pipes 11 feeding the feed section 4. The deflector 40 may reduce sanding occurrences in around the inlet to the feed pipes 11, without limitation.

The external oversize protection apparatus 3 may comprise one or more side mounts 48 for supporting the same. Structure or framework (not shown) may be mounted to mounts 48 to support the external oversize protection apparatus 3. The apparatus may also include one or more breather pipes 14 in the form of pipes extending from upper portions of the screen box 12. The one or more breather pipes 14 may fluidly communicate with the collection basin 21 to allow air to escape from the system and reduce the amount of uncontrolled air inside the fluidized bed separator 1 under normal operating conditions. The breather pipes 14 may serve a safety apparatus for preventing portions of the fluidized bed separator 1 from becoming over pressurized, and may further serve to provide a driving head for the external oversize protection apparatus 3 which is filled with material during operation.

Periodic online cleaning/de-sanding of the external oversize protection apparatus 3 may be accomplished by energizing the purge valve actuator 44 to open the purge valve 45. Purging fluid may be provided to a first purge fluid inlet 34 and/or to a second purge fluid inlet 46 in/around the oversize chute 30 or oversize removal pipe 33.

It should be known that the specific features, function, process steps, and possible benefits shown and described herein in detail are purely exemplary in nature and should not limit the spirit and/or scope of the invention.

For example, while not shown for clarity, it should be understood that upper fluidization chamber 19 may comprise a cover, top, or lid to maintain a closed environment fluidized bed separator 1 system.

Moreover, although the invention has been described in terms of particular embodiments and applications, one of ordinary skill in the art, in light of these teachings, can generate additional embodiments and modifications without departing from the spirit of the claimed invention.

Accordingly, it is to be understood that the drawings and descriptions herein are proffered by way of example to facilitate comprehension of the invention and should not be construed to limit the scope thereof.

LISTING OF REFERENCE NUMERALS

1 Fluidized bed separator (e.g., a particle size and/or density classifier or a coarse particle flotation unit)
2 Upper end
3 External oversize protection apparatus
4 Feed section
5 Tapered body section
6 Main separation chamber (e.g., an autogenous dense medium separator chamber)
7 Fluidizing section (e.g., a fluidized bed separator section)
8 Support frame
9 Fluidization fluid inlet(s)
10 Body wall
11 Feed pipe(s)
12 Screen box
13 Inlet
14 Breather pipe(s) (e.g., an air purge pipe)
15 Launder(s)
16 Breakaway plate mount(s)
17 Inclined plate(s)
18 Channel(s)
19 Upper separation chamber (e.g., lamella settler)
20 Bottom end
21 Collection basin
22 Step-down(s)
23 Outlet(s) (e.g., can be generally horizontally-arranged, vertically upwardly arranged, or arranged at an angle between 30 degrees below horizontal and vertically upwards/90 degrees above horizontal)
24 Vertically-oriented flow lead-in tab(s)
25 Fluidization fluid distribution chamber
26 Fluidization outlet(s)
27 Lower outflow pipe (e.g., for removal of oversize material)
28 Horizontally-arranged plate(s) or baffle(s)
29 Inclined floor (e.g., solid or secondary screen)
30 Oversize chute
31 Chute side panel(s)
32 Chute end plate
33 Oversize removal pipe
34 First purge fluid inlet
35 Collection basin outlet
36 Feed pipe endcap(s)
37 Top access panel (e.g., removable)
38 One or more screens (e.g., inclined screens)
39 Cross plate(s)
40 Deflector(s)
41 Main chamber
42 Regulated size chamber
43 Bottom floor of screen box
44 Purge valve actuator (e.g., solenoid, fluid cylinder)
45 Purge valve (e.g. knife gate)
46 Second purge fluid inlet
47 Chute top plate
47 Side mount(s)
49 Lamella cartridge(s)
50 Angled section
51 Lamella plate( )
52 Welded portion (e.g., one or more welds)
53 Removal or installation feature
54 First breakaway plate
55 Second breakaway plate
56 Removal/installation feature(s)
57 Top end of breakaway plate(s)
58 Bottom end of breakaway plate(s)
59 Angled abutment surface(s)
60 Saddle seat
h Height of lamella cartridge
w Width of lamella cartridge
t Thickness of lamella cartridge

The invention claimed is:

1. A fluidized bed separator (1) comprising a body wall (10) defining:
a fluidizing section (7) having a fluidization fluid distribution chamber (25) and at least one fluidization fluid inlet (9) for introducing fluidization fluid into the fluidization fluid distribution chamber (25), the fluidizing section (7) comprising an upper panel equipped with a plurality of fluidization outlets (26);
a main separation chamber (6) above the fluidizing section (7) for establishing a fluidized bed within the main separation chamber (6) by virtue of fluidization fluid exiting the fluidization fluid distribution chamber (25) through the fluidization outlets (26) and entering into the main separation chamber (6); and
an upper separation chamber (19) above the main separation chamber (6) comprising a plurality of inclined plates (17), channels (18) defined between the inclined plates (17); and one or more launders (15) feeding a collection basin (21);
the fluidized bed separator (1) further comprising a feed section (4) below the upper separation chamber (19) and above the main separation chamber (6), the feed section (4) comprising one or more feed pipes (11) extending substantially horizontally and transversely through the body wall (10) and into the feed section (4); the one or more feed pipes (11) being positioned lower than or below the inclined plates (17);
wherein the one or more feed pipes (11) comprise a plurality of outlets (23) which are each configured to introduce feed slurry comprising solids into the feed section (4) in a generally horizontal direction which is generally transverse to a vertical axis of the fluidized bed separator (1), such that the one or more feed pipes (11) are configured to distribute the feed slurry across the feed section (4) and toward the body wall (10) or toward an inner perimeter of the feed section (4), wherein the plurality of outlets (23) are also positioned lower than or below the inclined plates (17).

2. The fluidized bed separator (1) according to claim 1 wherein each of the one or more feed pipes (11) comprise a reduction in diameter or comprise at least one step-down portion (22); wherein the at least one step down portion (22) is defined by a reduction in diameter of the one or more feed pipes (11) within the feed section (4).

3. The fluidized bed separator (1) according to claim 1, further comprising an external oversize protection apparatus (3) which is separate from and/or positioned externally with respect to the body wall (10);
wherein the external oversize protection apparatus (3) comprises at least one of the group consisting of: a screen box (12), an inlet (13), one or more screens (38), an oversize chute (30), and an oversize removal pipe (33) communicating with the oversize chute (30) for removing oversize particles and preventing oversize particles from entering the one or more feed pipes (11).

4. The fluidized bed separator (1) according to claim 1, further comprising an external oversize protection apparatus (3) including a main chamber (41) which is located above one or more screens (38) and above an oversize chute (30); and wherein the external oversize protection apparatus (3) further comprises a regulated size chamber (42) which is located below the one or more screens (38) and below the oversize chute (30).

5. The fluidized bed separator (1) according to claim 1, further comprising an external oversize protection apparatus (3) including a screen box (12) and a deflector (40) adjacent a bottom floor (43) of the screen box (12) for splitting and distributing feed slurry evenly to two or more feed pipes (11).

6. The fluidized bed separator (1) according to claim 1, further comprising an external oversize protection apparatus (3) which includes a screen box (12) and one or more removable top access panels (37) which cover openings in the screen box (12); the one or more removable top access panels (37) facilitating cleaning or servicing portions of the screen box (12).

7. The fluidized bed separator (1) according to claim 3, wherein the external oversize protection apparatus (3) further includes a purge valve (45) and purge valve actuator (44) to remove oversize material from the oversize removal pipe (33).

8. The fluidized bed separator (1) according to claim 3, wherein the external oversize protection apparatus (3) further includes at least one purge fluid inlet (34, 46) for flushing solids from the oversize channel (30) and/or the oversize removal pipe (33).

9. The fluidized bed separator (1) according to claim 3, wherein the external oversize protection apparatus (3) further includes at least one breather pipe (14) fluidly communicating with the collection basin (21) or channels (18) of the upper separation chamber (19).

10. The fluidized bed separator (1) according to claim 1, further comprising a tapered body section (5) below the feed section (4) and above the main separation chamber (6).

11. The fluidized bed separator (1) according to claim 1, wherein a vertically-oriented flow lead-in tab (24) is provided to the bottom of some or all of the inclined plates (17).

12. A method of operating a fluidized bed separator (1) described in any one of claims 3-11, comprising the step of removing oversize material from the screen box (12), oversize channel (30), and/or oversize removal pipe (33) via the purge valve (45) by periodically activating the purge valve actuator (44).

13. The method according to claim 12, further comprising the step of introducing purge fluid through a first (34) and/or second (46) purge fluid inlet to assist with removing oversize material from the screen box (12), oversize channel (30), and/or oversize removal pipe (33).

* * * * *